W. E. BITTNER.
LADDER HOOK.
APPLICATION FILED MAY 29, 1917.
1,252,224.
Patented Jan. 1, 1918.
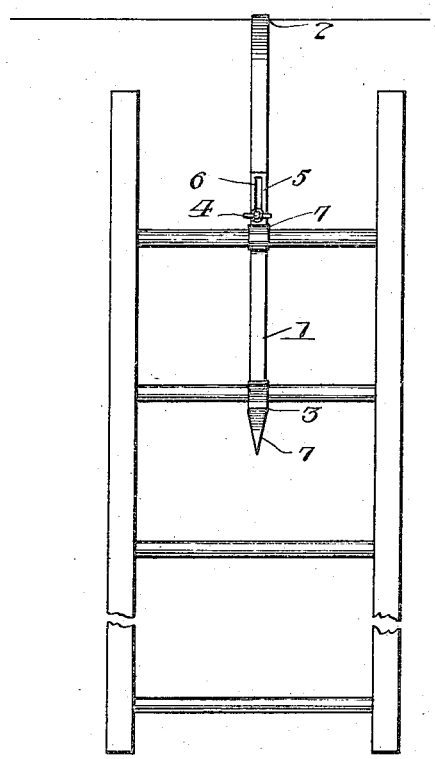
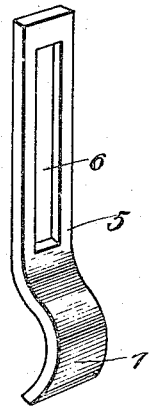
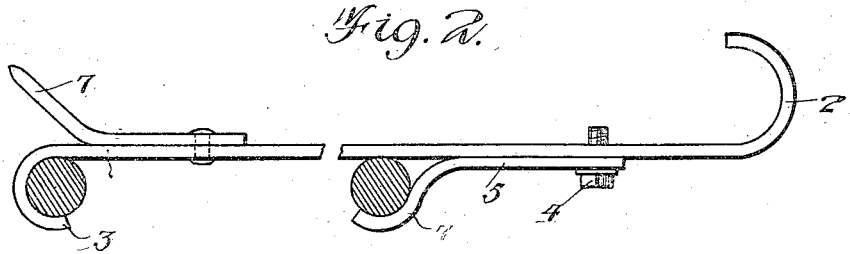
INVENTOR
Walter E. Bittner.
BY Victor J. Evans
ATTORNEY
WITNESSES

UNITED STATES PATENT OFFICE.

WALTER E. BITTNER, OF BECKLEY, CONNECTICUT.

LADDER-HOOK.

1,252,224. Specification of Letters Patent. Patented Jan. 1, 1918.

Application filed May 29, 1917. Serial No. 171,755.

*To all whom it may concern:*

Be it known that I, WALTER E. BITTNER, a citizen of the United States, residing at Beckley, in the county of Hartford and State of Connecticut, have invented new and useful Improvements in Ladder-Hooks, of which the following is a specification.

This invention relates to ladder hooks adapted to be used upon the roof of a building for sustaining a ladder thereon and it consists in the novel features hereinafter described and claimed.

An object of the invention is to provide a hook of the character stated which is of simple and durable structure and which will effectually hold a ladder in position upon an inclined roof when used for repairs or other purposes.

With this object in view the device includes a shank with oppositely disposed hooks formed at the ends thereof and disposed at the opposite sides of the shank. A clip is adjustably mounted upon the shank and is adapted to coöperate with one of the said hooks for the purpose of securely holding the ladder in position upon a roof. A prong is mounted at one end portion of the shank and is disposed in the same general direction as one of the hooks and in the opposite direction from the other hook.

When the device is in position upon the roof of a structure one of these hooks is caught over the ridge of the roof and the rungs of the ladder are secured between the other hook and the adjustable clip. The said prong is adapted to penetrate the shingles or sheathing of the roof whereby the ladder is held in position against movement in any direction and the device will maintain its position upon the roof in the event that the hook at the upper end of the shank should become disengaged from the roof.

In the accompanying drawings:—

Figure 1 is a plan view of the device showing the same applied to a ladder;

Fig. 2 is a side elevation of the device;

Fig. 3 is a perspective view of a clip used in the device.

The device includes a shank 1 which is preferably formed from iron or other metal and which is provided at its end with a hook 2 and its lower end with a hook 3. These hooks are disposed in opposite direction and lie at the opposite sides of the shank 1. A bolt 4 is screw threaded through the intermediate portion of the shank 1 and engages the shank of a clip 5 which is mounted on the side of the said shank. The said clip 5 is provided with a slot 6 through which the bolt 4 passes and hence when the bolt 4 is loosened the clip 5 may be adjusted toward or away from the hook 3. The clip 5 is provided with a curved end 7' adapted to engage the rung of a ladder. A prong 7 is mounted at that end portion of the shank 1 which carries the hook 3 and is located at the opposite side of the shank 1 from the said hook 3. The prong 7 is disposed in the same general direction as the hook 2 and in an opposite direction from the hook 3.

In use, the clip 5 is adjusted upon the shank so that the said clip and the hook 3 receives between them the adjacent rungs of a ladder. The hook 2 is then engaged over the ridge of a slanting roof and the shank 1 extends along the roof whereby the prongs 7 may engage into the material of the roof and the ladder which is attached to the device may lie flat upon the roof.

Thus a workman may use the ladder in safety for repairing, painting or for performing any other work upon the roof. In the event that the hook 2 should become disengaged from the ridge of the roof by fracture or otherwise, the prong 7 will maintain its engagement with the material of the roof and prevent the device from slipping with relation to the roof. Should the prong 7 break or become disengaged from the roof, the hook 2 which is engaged over the ridge of the roof will hold the device in position. The hook and the prong may be made of hardened steel to add strength and durability to the structure.

From the foregoing description taken in conjunction with the accompanying drawing, it will be seen that a ladder hook of simple and durable structure is provided, and that the same will effectually hold in position upon a slanting roof, a ladder to be used by a workman making repairs or performing other work upon the roof.

Having described the invention what I claim is:—

A ladder support comprising a shank provided at its ends with oppositely disposed hooks which lie at the opposite sides of the shank, a clip adjustably mounted upon the shank, means for securing the clip at an adjusted position and a prong mounted upon one end portion of the shank in the vicinity of one of the hooks and disposed in the opposite direction from the said hook and in the same general direction as the other hook.

In testimony whereof I affix my signature.

WALTER E. BITTNER.

Copies of this patent may be obtained for five cents each, by addressing the "Commissioner of Patents, Washington, D. C."